Dec. 8, 1942.                L. SUPIN                    2,304,715
                          LOOSE LEAF BINDER
                       Filed Oct. 14, 1938          7 Sheets-Sheet 1
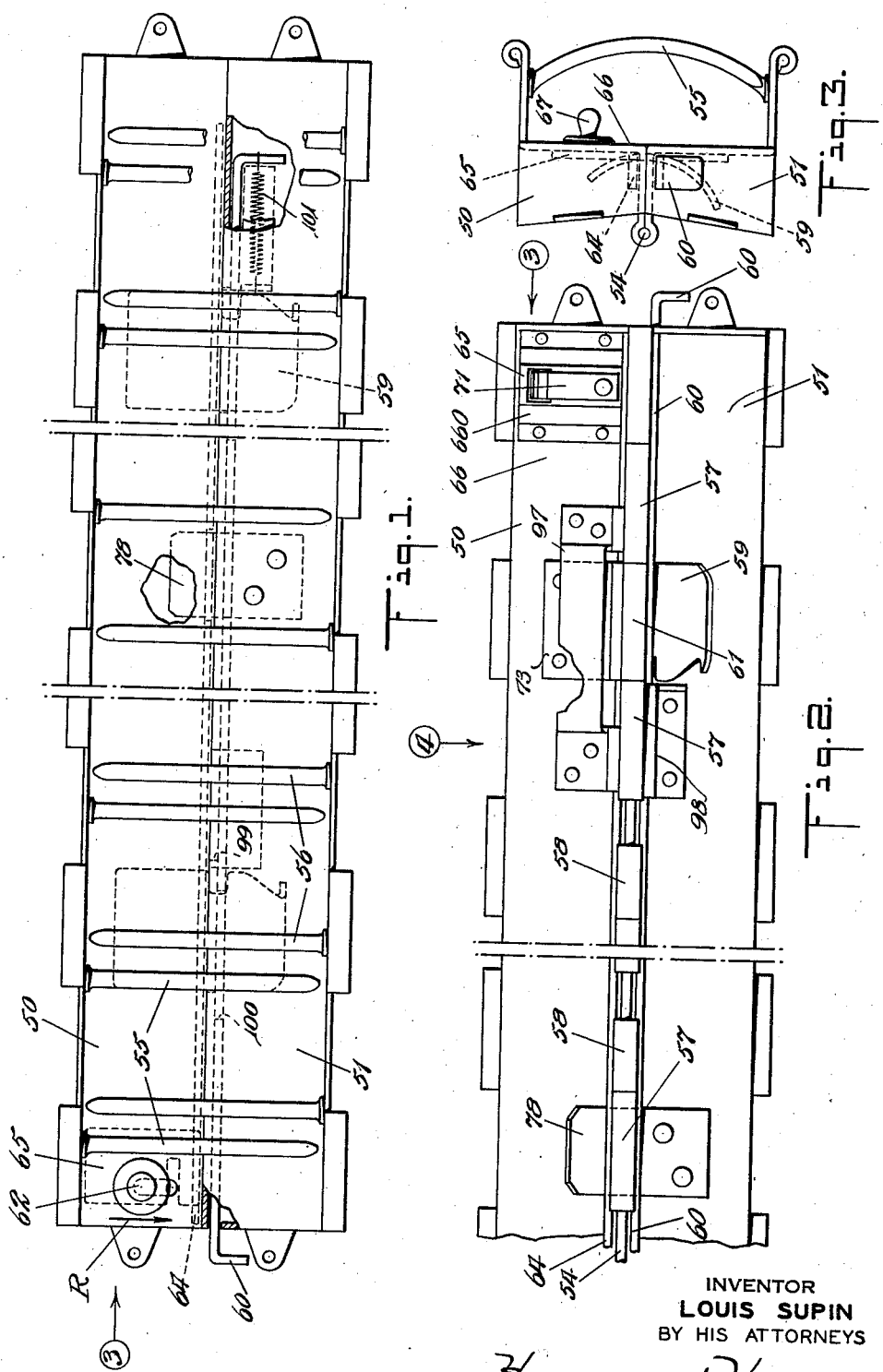
INVENTOR
LOUIS SUPIN
BY HIS ATTORNEYS
Howson and Howson

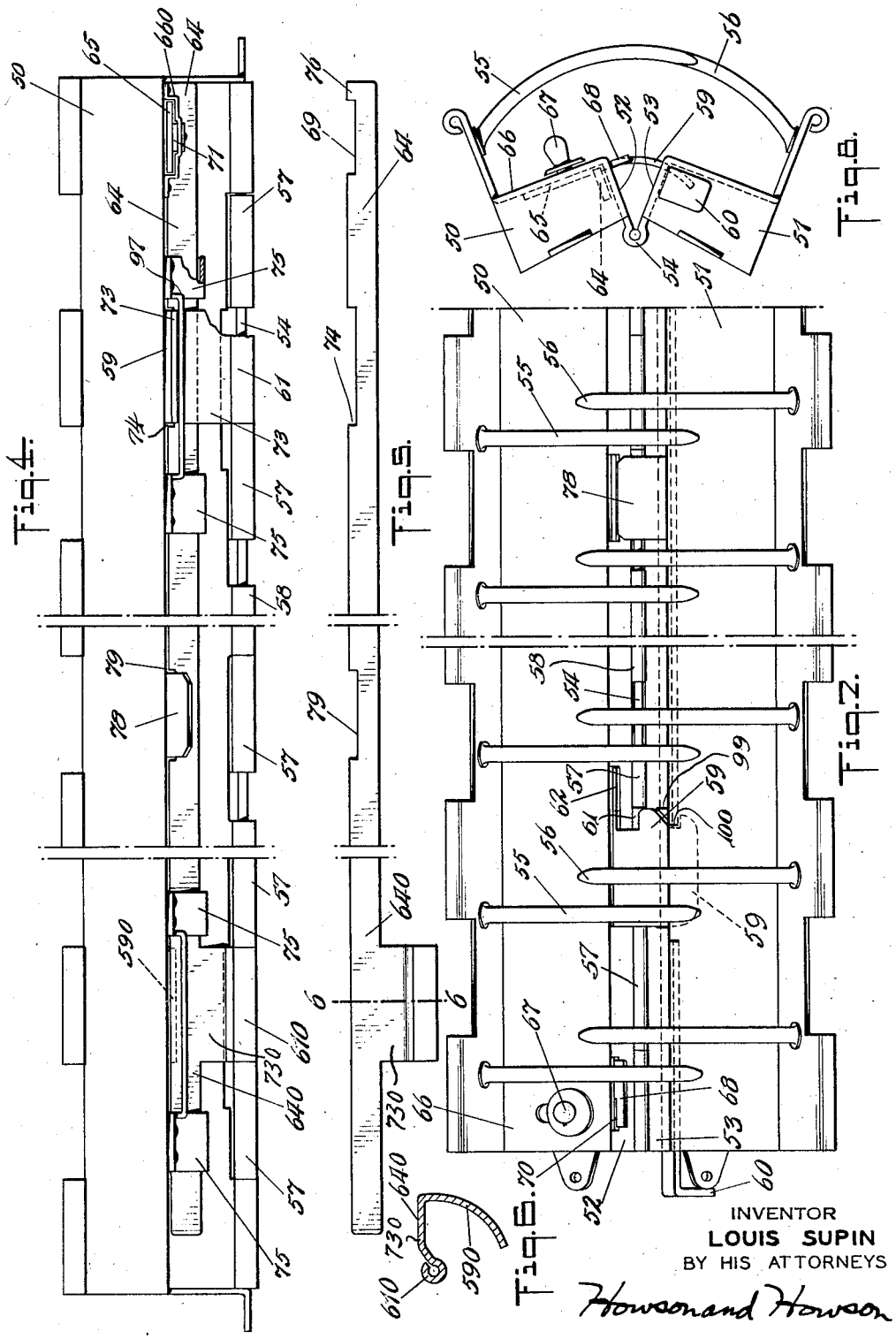

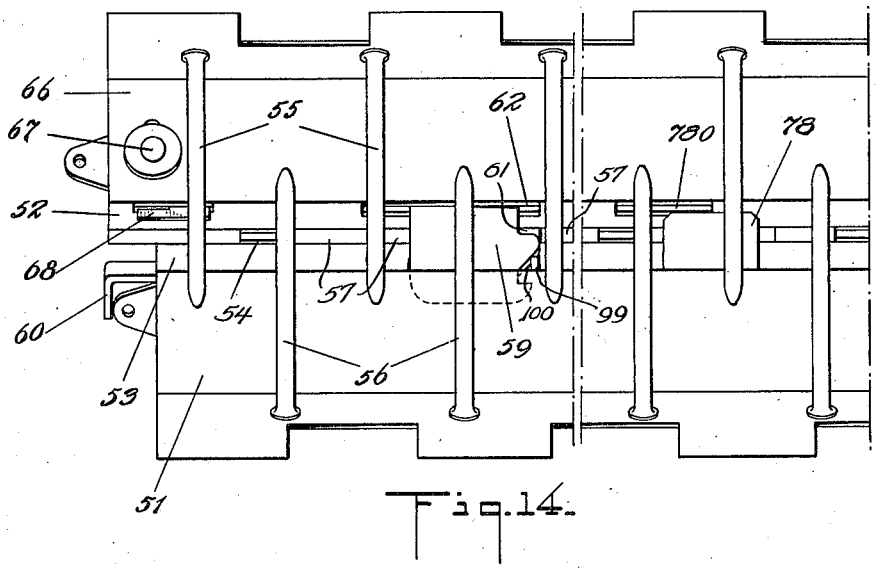
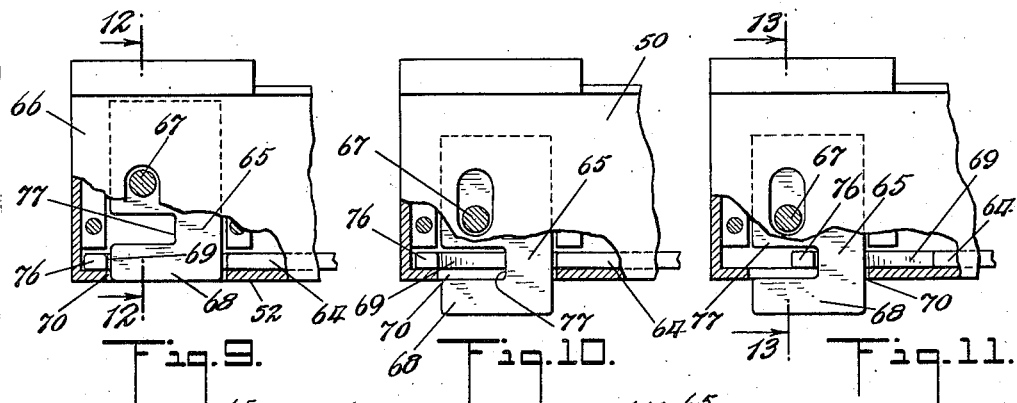
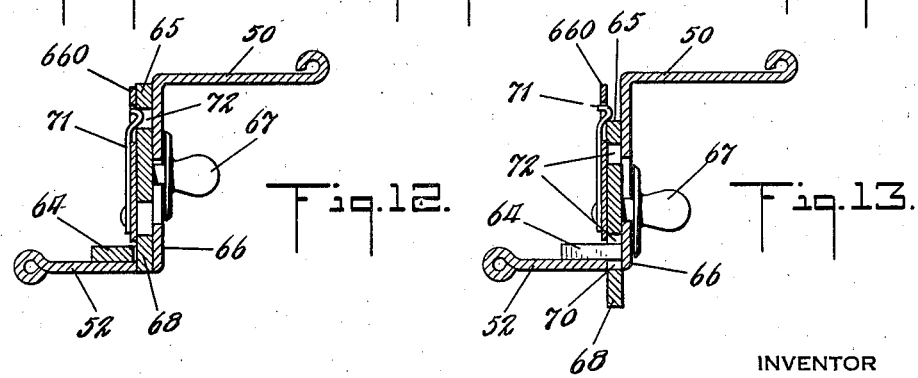

Dec. 8, 1942.  L. SUPIN  2,304,715
LOOSE LEAF BINDER
Filed Oct. 14, 1938  7 Sheets-Sheet 4

INVENTOR
LOUIS SUPIN
BY HIS ATTORNEYS
Howson and Howson

Dec. 8, 1942.  L. SUPIN  2,304,715
LOOSE LEAF BINDER
Filed Oct. 14, 1938  7 Sheets-Sheet 5

INVENTOR
LOUIS SUPIN
BY HIS ATTORNEYS
Howson and Howson

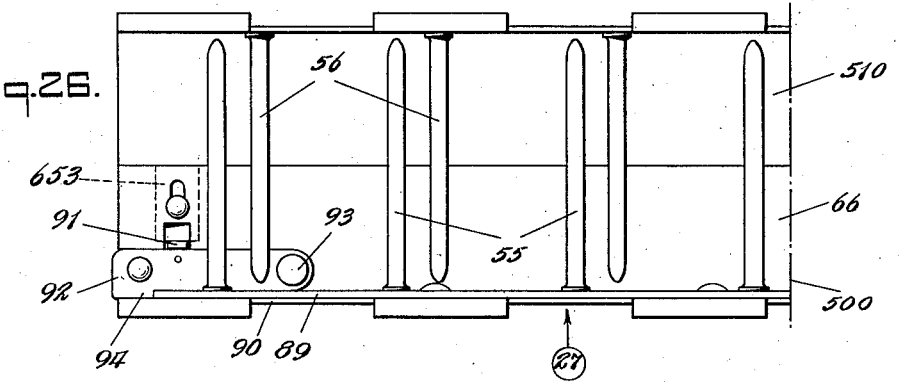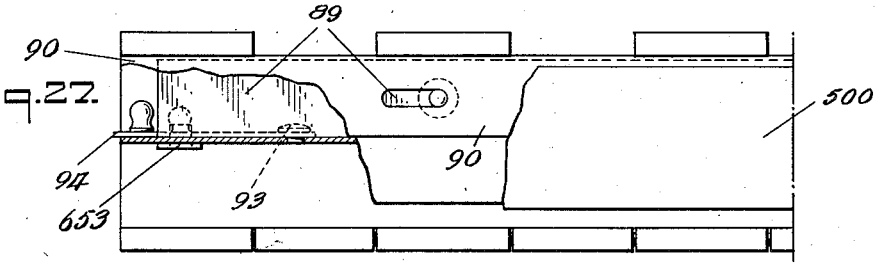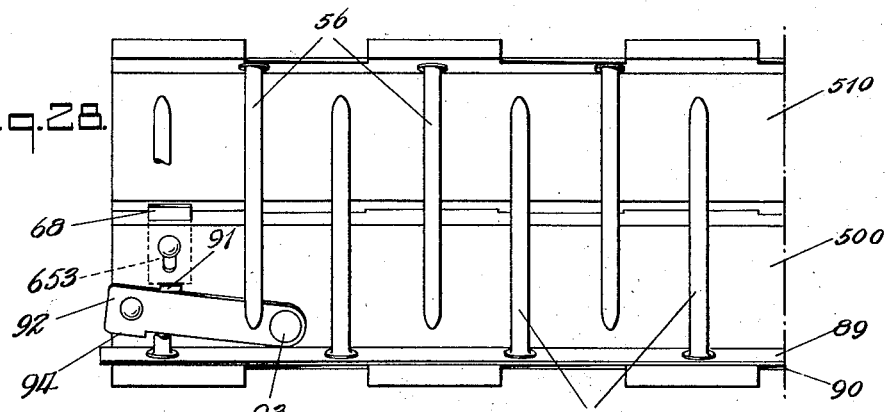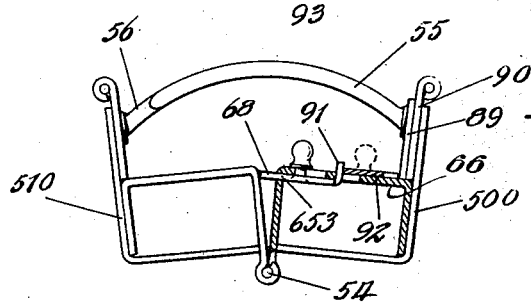

Dec. 8, 1942.  L. SUPIN  2,304,715

LOOSE LEAF BINDER

Filed Oct. 14, 1938  7 Sheets-Sheet 7

INVENTOR
LOUIS SUPIN
BY HIS ATTORNEYS

Howson and Howson

Patented Dec. 8, 1942

2,304,715

UNITED STATES PATENT OFFICE 2,304,715

LOOSE-LEAF BINDER

Louis Supin, Brooklyn, N. Y., assignor to Boorum & Pease Company, Brooklyn, N. Y., a corporation of New York Application October 14, 1938, Serial No. 235,069

35 Claims. (Cl. 129—17)

See also application Ser. No. 458,872, filed September 18, 1942, which is a division hereof.

The invention is particularly useful in binders of the kind usually known as shift type visible index prong binders, in which the sheets are filed with a top or bottom edge visible, i. e., in overlapping relation, and in which the sheets are moved to new positions by offsetting the prongs. This invention relates to novel improvements in means for locking the shifting mechanism in such loose leaf binders.

A disadvantage experienced in the use of this type of binder is that when the binder is open in posting or in shifting position, it often happens that the prongs may be shifted inadvertently, with the accompanying danger of getting the sheets out of their proper order. Similarly, the book may inadvertently be closed when the prongs are in offset position, which is also apt to disarrange the desired order of the sheets.

An object of the invention is to provide means whereby the prongs may be locked against inadvertent shifting. A further object is to prevent closing of the book when the prongs are offset.

Other objects and advantages will appear more fully from the following description taken in connection with the accompanying drawings which form a part of the specification, in which—

Figures 1 to 14, inclusive, show the novel locking means incorporated in a binder in which the shifting takes place longitudinally along the main hinge of the metal parts of the binder.

Fig. 1 shows a partial front view in elevation of the metal of a preferred form of binder embodying the novel locking means, the parts being shown in closed and locked position;

Fig. 2 shows a partial back view in elevation of the metal of Fig. 1;

Fig. 3 is an end view in elevation of Figs. 1 and 2, looking in the direction of the arrow 3;

Fig. 4 is a side view in elevation of the metal of Fig. 1, looking in the direction of the arrow 4 in Fig. 2;

Fig. 5 is a view of the shift locking bar;

Fig. 6 is a view of a shift locking bar in cross section taken on line 6—6 of Fig. 5 showing the locking bar unitary with a detent;

Fig. 7 is a view in front elevation showing the parts of Fig. 1 in the partially open or posting position, the prongs being in normal or non-offset position with the shifting mechanism unlocked;

Fig. 8 is an end view of the metal of Fig. 7;

Figure 12:
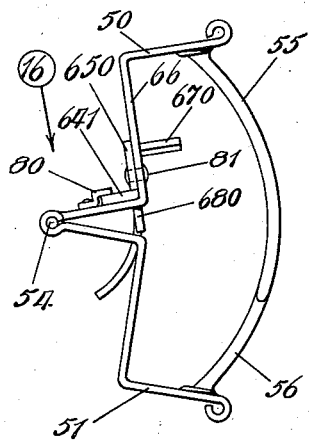
Figure 15:
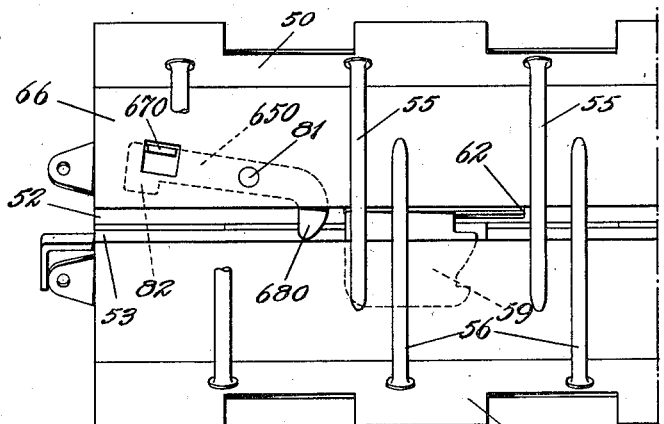
Figure 16:
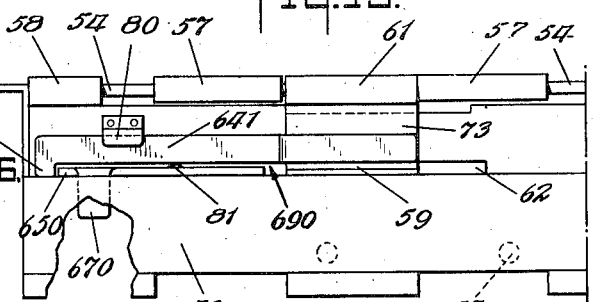
Figure 18:
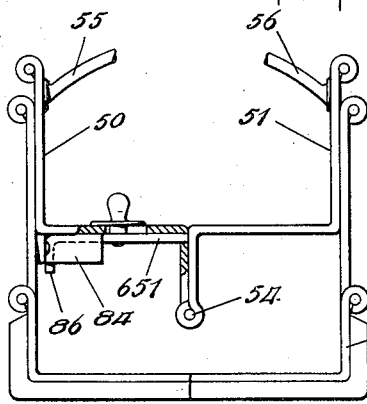
Figure 19:
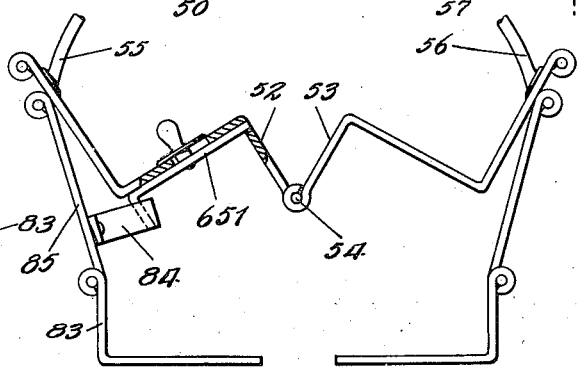
Figure 20:
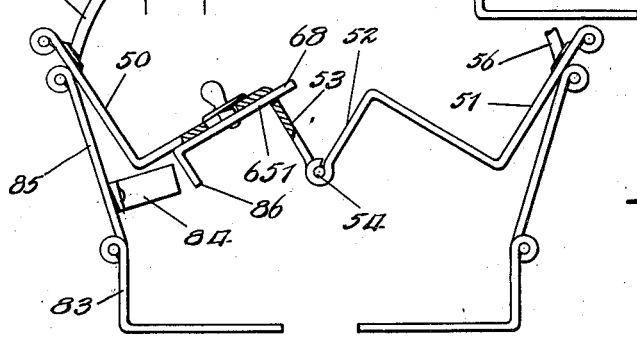
Figure 21:
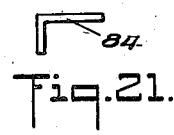
Figure 22:
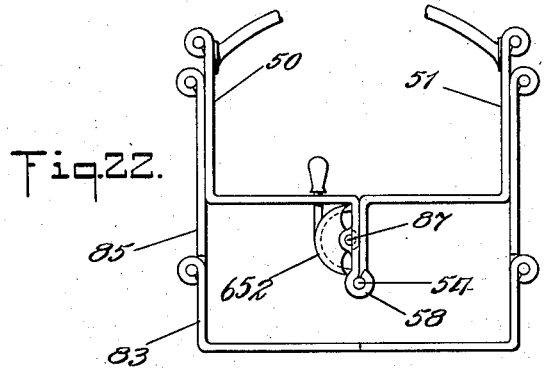
Figure 23:
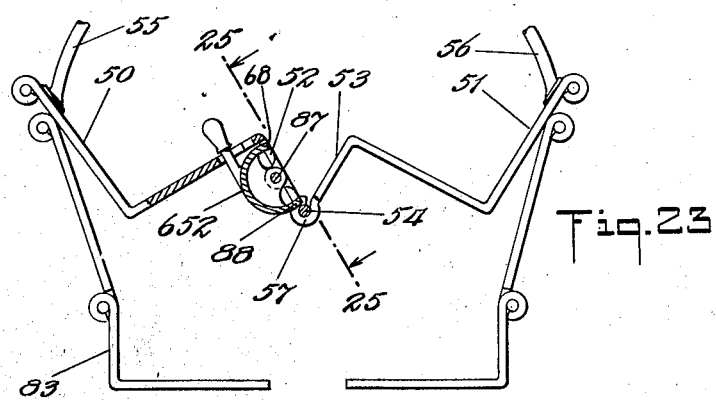
Figures 24, 25:
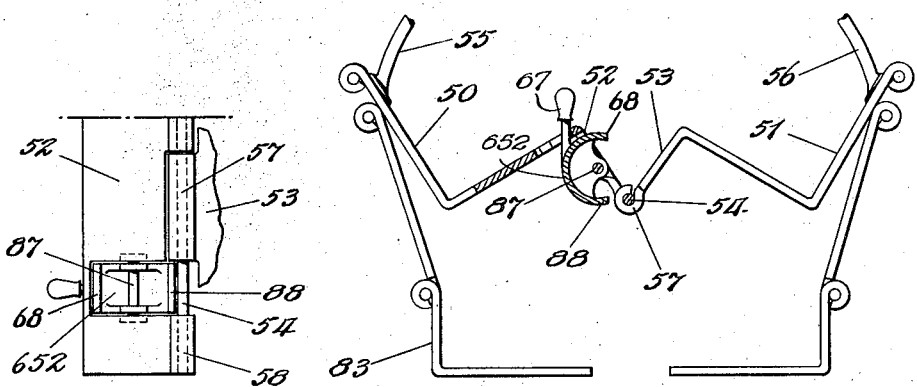
Figure 30:
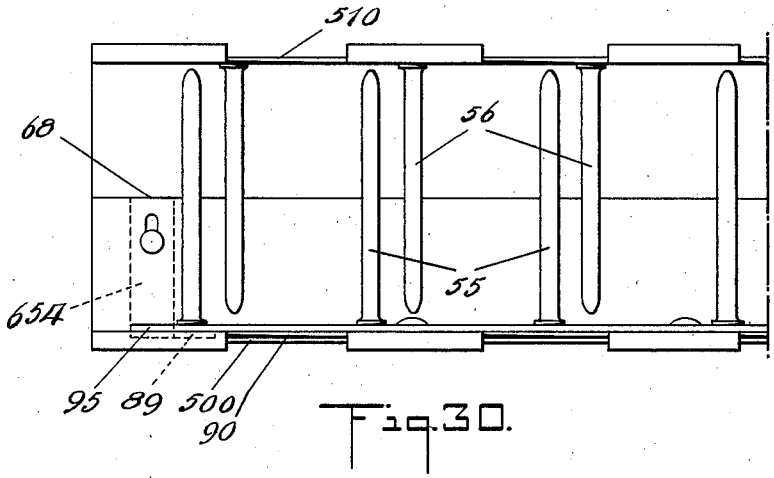
Figure 31:
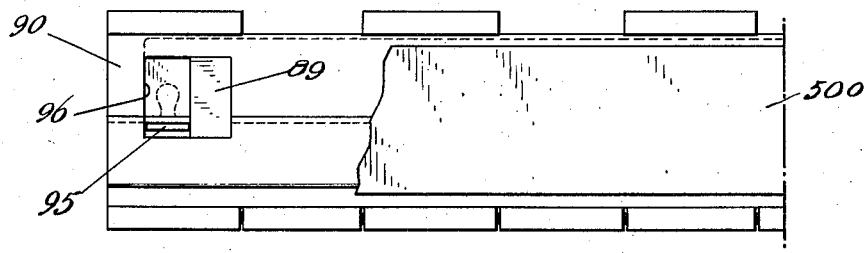
Figure 32:
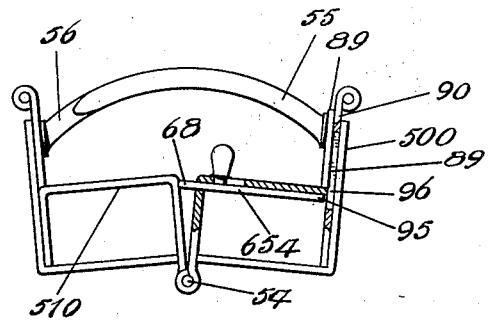

Figs. 9 to 13, inclusive, are details on a larger scale of the shift locking bar and sliding stop of Figs. 1 to 8 and 14, shown in various positions;

Fig. 9 is a view in front elevation, showing these parts in locked position, as shown in Figs. 1 to 3;

Fig. 10 is a similar view showing the parts unlocked, but not shifted, all as shown in Figs. 7 and 8;

Fig. 11 is a similar view showing the parts shifted, as shown in Fig. 14;

Fig. 12 is a cross section on the line 12—12 of Fig. 9;

Fig. 13 is a similar cross section on line 13—13 of Fig. 11;

Fig. 14 is a front view similar to Fig. 7, but showing the prongs in offset position;

Figs. 15 to 17, inclusive, show details of a modification in which the latch is pivoted rather than sliding;

Fig. 15 is a plan view of one end of the metal of the modified binder in partially open, unlocked, but non-offset position;

Fig. 16 is a side view in elevation of one end of the metal of the binder of Fig. 15, looking in the direction of arrow 16 in Fig. 17, parts being broken away to show details;

Fig. 17 is an end view of the binder of Figs. 15 and 16;

Figs. 18 to 21, inclusive, show a further modification, in which the stationary member of the shift locking mechanism is on an outer back of the binder, each view showing an end, partly in section, of the metal of the binder;

Fig. 18 shows the second modified form of binder closed with the shift mechanism locked;

Fig. 19 shows the binder of Fig. 18 open with the shift mechanism locked;

Fig. 20 shows the same binder open with the shift mechanism unlocked;

Fig. 21 is a detail of a stop on the binder of Figs. 18 to 20;

Figs. 22 to 25, inclusive, show a further modification in which the latch is arcuate and is pivoted on one of the meeting faces of the halves of the binder;

Fig. 22 shows an end view of this third modified form of binder in closed position with the shift mechanism locked;

Fig. 23 is an end view of the same binder open but with the shift mechanism locked;

Fig. 24 is an end view of the same binder open with the shift mechanism unlocked;

Fig. 25 is a side elevation, partly in section, of the latch, looking in the direction of the arrows 25—25 in Fig. 23;

Figs. 26 to 29, inclusive, show a further modification in which the invention is shown embodied in a binder where the prongs are shiftable independently of relative movement between the two halves of the binder:

Fig. 26 is a front view in elevation showing one end of this fourth modified form of binder closed and locked;

Fig. 27 is a side elevation of the same binder partially broken away looking in the direction of arrow 27 in Fig. 26;

Fig. 28 is a front view in elevation of one end of the same binder showing the parts in posting position;

Fig. 29 is an end view partly in section of Fig. 28;

Figs. 30 to 32, inclusive, show a fifth modification like Figs. 26 to 29, except that the latch is unitary rather than double;

Fig. 30 is a plan view of one end of the fifth modified form of binder showing the mechanism closed and locked;

Fig. 31 is a side view in elevation of the mechanism of Fig. 30.

Fig. 32 is an end view of the fifth modification, unlocked and partly open, partly in section.

The lose leaf binder in which the invention is embodied consists of the usual two frame members or halves 50 and 51, having meeting faces 52 and 53 respectively.

The shifting mechanisms illustrated in the several figures of the drawings are of known type and will be described only insofar as seems necessary to explain their cooperation with the novel locking means.

The shifting means shown in Figures 1 to 25, shift the prong bearing portions of the binder relatively to each other longitudinally along a central hinge pin 54.

In the form shown in Figures 1 to 14 inclusive, two sets of prongs 55 and 56 are rigidly borne by halves 50 and 51 respectively of the metal binding parts, which are hinged together in longitudinally sliding relation by the hinge pin 54, but this arrangement is optional. Hinge lugs 57 on the half 51 are of uniform length and are uniformly spaced, while hinge lugs 58 on the other half 50 are shorter than the spaces between the lugs 57, and are spaced farther apart than the length of the lugs 57, as perhaps best shown in Figure 2, with the result that the halves are capable of longitudinal movement relative to each other upon the hinge pin 54.

The two halves, hinged together as above described, are provided with detents on the one cooperating with binder locking means on the other for holding the halves of the binder either in closed position as shown in Fig. 3, or in partially open or posting position, as shown particularly in Figs. 7, 8 and 14. One of these detents is shown in Figures 7 and 14 at 59 as constituting a fin projecting through an elongated slot 62, in the face 52, the projecting part being shown as having two notches, and in Figure 3 the projecting part is shown as being arcuate, concentric with the pintle 54. The detent extends through a registering slot 99 in the opposite face 53.

As shown in Figure 4 a bracket 73 is secured to the detent 59 on the under side of the half 50 and extends from the detent 59 to a gudgeon or sleeve 61 mounted on the hinge pintle 54. The bracket 73 is slidably supported on the under side of the face 66 by a strap 97. See also Fig. 2.

The binder-locking means cooperating with the detent 59 comprises a locking catch or bar 60 which as shown in Figures 2 and 3 is mounted on the under side of the face 53 of the half 51 and there retained in longitudinally slidable relation by a guide 98 shown in Figure 2. The bar 60 has a notch 100 shown in Figs. 7 and 14. As shown in Figure 1 a tension spring 101 normally urges the bar 60 in a direction to project its extending end outward, which brings the notch 100 out of register with slot 99, so that the end of the notch engages with the notches in the detent 59 to hold the halves selectively in half open, as shown in Figs. 7 and 14, or closed position, as shown in Figs. 1 and 2.

In order to insure cooperation between the locking means 60 which is on side 51, and the detents 59, which are slidingly carried by side 50, and to insure register of the detents 59 with the slots 99, the gudgeons or lugs 61 associated with detents 59 are made approximately the same length as the space between lugs 57 on half 51, with the result that lugs 61 and detents 59 are relatively stationary that is to say not longitudinally movable with regard to the opposite side 51. In order to permit the sleeve 61 to fit in between adjacent lugs 57, the shorter lug 58 which would have occurred at this point is omitted or cut away. The slot 99 is longitudinally coextensive with the space between the adjacent lugs 57, so that the sleeve 61 therebetween retains the detent 59 which is bracketed thereto, at all times in register with the slot 99. The slot 62 in face 52 is longer than slot 99 in face 53, so that the left ends of the slots register when the parts are in normal non-shifted position as shown in Fig. 7 and the right ends register when the parts are shifted as shown in Fig. 14 with the result that the detent 59 may enter slot 99 in face 53 and engage notch 100 in bar 60 in either shifted or non-shifted position.

The slots 62 provided in face 52 of side 50 are elongated to permit and limit the longitudinal movement of the side 50 relative to the detents 59. However, although the detent 59 is mounted partly within the half 50 the detent does not move with the half 50 when it is shifted, but instead remains with the half 51 and always in register with the slot 99 therein.

As illustrated in Figs. 1 to 14 inclusive, the novel means for locking the shifting mechanism comprises a shift locking bar 64 (Figure 5), assembled in the binder in such relation to the two halves 50 and 51 that it moves longitudinally with one of them but is relatively stationary longitudinally in relation to the other half; and a latch 65 which in closed position prevents longitudinal movement of bar 64, thereby preventing relative longitudinal movement between half 50 and prongs 55 on the one hand and half 51 and prongs 56 on the other.

In Figs. 1 to 14 inclusive, the latch 65 is borne by web 66 of the half 50. The latch may be held upon the web by any suitable means such as a housing 660, as perhaps best shown in Fig. 12. The latch is movable at right angles to the longitudinal shifting movement of the sides upon their hinge pin 54. Suitable means such as button 67 may be provided for manually operating the latch. The latch is provided with a tongue 68 which in open position protrudes through a notch 69 of bar 64 and slot 70 of face 52, as shown in Figs. 8, 10 and 11, so that the meeting of the faces 52 and 53 in closing the book, automatically actuates the latch and locks the shifting mechanism. Any suitable means may be provided to hold the latch yieldingly in open or closed position until it is operated manually by means of the button 67, or automatically by pressure of the face of the opposite half. Such a means is shown as a spring 71 secured to housing 660. In closed position the spring cooperates with a notch 72 in the latch as perhaps best shown in Fig. 12. In open position the spring cooperates with the end of the latch opposite the tongue 68, as perhaps best shown in Fig. 13.

Shift locking bar 64 may be held adjacent the rear of flange 52 of half 50 of the binder by suitable means which may comprise the bracket or strip 73 (as perhaps best shown at the right hand end of Fig. 4), which may connect hinge lug 61 and detent 59 in any suitable way. Bar 64 may be notched at 74 to receive detent 59 sufficiently snugly to prevent appreciable longitudinal movement between the two.

As shown in the structure illustrated at Figure 6, and at the left hand end of Figs. 4 and 5, shift locking bar 640 may be made unitary with detent 590, strip 730 and lug 610. This integral construction does away with the flat inward extension of the detent 59 and the flat inward flange of the bracket 73, both of which are shown in the right hand end of Figure 4, inside the strap 97. Those extensions are employed for the riveted joint shown in Figure 2 which is done away with by the integral construction, as is also the notch 74.

The integral hinge lug 610 is mounted on the hinge pintle 54 between the lugs 57, the integral strip 730 extends from the hinge lug 610 upwardly close inside the face 52, the integral bar 640 extends from the strip 730 along inside the face 52 and the detent 590 extends from the bar 640 out through the slot 62 in the face 52. The bar 97 could be omitted, but for convenience in assembly it may be retained as a spacer for the straps 75 hereinafter described.

The shift locking bar may be further supported by straps 75 which may be so placed upon side 50 as to form stops against which strips 73 or detents 590 will abut to limit the relative longitudinal movement between the halves 50 and 51 upon the pin 54.

While it will be obvious that either half can be held stationary while the other half is shifted longitudinally relatively to it along the hinge pin 54, for convenience of description we shall speak of half 51 as relatively stationary, and of half 50, which bears the detents 59 and the novel locking bar 64 and latch 65, as moving longitudinally or shifting. Under these conditions, due to the spacing of the hinge lugs described above, the detents 59 and the locking bar 64 will not move longitudinally with half 50 by which they are borne, but will remain relatively stationary with the half 51.

Details of the shift locking mechanism are perhaps best shown in Figs. 5 and 9 to 13 inclusive. In operation of the device, when the novel parts are in locked position (Figs. 9 and 12) and the prongs 55 and 56 are in normal, non-offset position (see for example Figs. 1 and 3), tongue 68 of the latch 65 is received in a notch 69 of the shift locking bar 64, thus preventing shifting of the latter and of the halves of the binder.

When the position of the latch 65 is manually changed to the position shown in Figs. 8 and 10, tongue 68 has left notch 69 and has also passed through slot 70 in the face 52 of half 50 and protrudes between the meeting faces 52 and 53 of the two halves. The halves can now be shifted longitudinally so that a lug or finger 76 of the bar 64 is received in a notch 77 of latch 65, as in Figs. 11 and 13. The prongs 55 and 56 and the halves of the binder will now be in offset position, as shown in Figure 14.

In operating the novel shift locking mechanism, starting with the book in closed position, the halves 50 and 51 will be in normal, i. e., non-offset position, and the meeting faces 52 and 53 will be adjacent each other as shown, for example, in Figs. 1 to 3, while the shift locking bar 64 and the latch 65 of the novel shift locking mechanism will be in the position shown in Figs. 9 and 12.

When the book has been opened and the meeting faces 52 and 53 have been moved apart, the prongs will remain locked in normal position until the shift-locking mechanism is manually unlocked by pressure upon the button 67 in the direction of the arrow R (see Fig. 1). Such pressure will move the latch 65 transversely of web 66, from the position shown in Figs. 9 and 12 to the position shown in Figs. 7, 8 and 10, in which tongue 68 protrudes between faces 52 and 53 of the two halves. In this position, the latch 65 can be manually closed, if desired, by pressure upon the button 67 in the direction opposite to arrow R. In the alternative, by closing the book, thus bringing the faces 52 and 53 of the two halves together, the pressure of face 53 abutting against the end of tongue 68 will automatically close the latch.

Also, in the position shown in Figs. 7, 8 and 10, the relation between the latch 65 and the bar 64 is such that the halves of the binder can be shifted longitudinally, so that the finger 76 of the bar 64 will come into the notch 77 of latch 65 (as shown in Figs. 11 and 13) and the halves of the binder will be offset and the prongs 55 and 56 will be shifted in relation to each other as shown, for example, in Fig. 14.

When the parts are in offset position closing of the halves 50 and 51 of the book is prevented and the binder is locked open by the relation of the latch 65 to the relatively stationary bar 64. The presence of the finger 76 of the shift locking bar in notch 77 of the latch when the parts are offset, prevents closing the latch 65 either by manual pressure upon button 67, or by the pressure of face 53 against the end of tongue 68. This constitutes a safety factor, for it prevents accidental displacement of sheets through inadvertent closing of the book when the prongs are in offset position.

If desired, a further safety factor may be provided by a spacer 78 carried by one of the meeting faces and abutting against the other. When the halves of the book are in normal relation to each other, the spacer 78 is received in a slot 780 on the opposite face and in a notch 79 in the shift locking bar 64. When the halves are offset, spacer 78 and slot 780 are offset from each other, so that the spacer abuts against the face of the opposite half.

From the foregoing description of the operation of the embodiment illustrated in Figs. 1 to 14, the operation of the modifications illustrated in the other figures of the drawings will be obvious to those skilled in the art.

In the modified form shown in Figures 15 to 17, inclusive, a shift locking bar 641 of reduced length is shown. The length of the bar is optional. The bar may be associated with strip 73 in any suitable way, as by spot welding, or it may be made unitary with detent 59 as in Fig. 6. If desired, a guide 80 for the bar 641 may be provided. A modified latch 650 is pivoted to web 66 at 81. The latch is provided at one end with a tongue 680, and at the other end another tongue or lug 82 and also a thumb piece 670, corresponding to the button 67 of the earlier views. When the latch is closed, lug 82 lies in notch 690 of the bar 641 and cooperates with the finger 76 of the bar to prevent longitudinal movement of the latter and hence to prevent shifting of the prongs.

In Figures 18 to 25, inclusive, in which further modifications are shown, halves 50 and 51 are housed in an outer back portion 83, which is stationary in the longitudinal direction of hinge pin 54 on which the halves move longitudinally in relation to each other. The back portion 83 carries arms 85 which engage the halves 50 and 51 in sliding relation.

A movable latch 651 carried by half 50 cooperates with a relatively stationary lug or stop 84 supported in any suitable way by an arm 85 on the same side of back portion 83 as half 50. A lug or tongue 86 on the latch cooperates with the lug 84 to lock and unlock the shifting mechanism. When the latch is closed, as shown in Figs. 18 and 19, the stationary lug 84 abuts against the lug 86 and prevents relatively longitudinal movement of the halves 50 and 51. When the latch is open, so that the tongue 68 protrudes between the meeting faces 52 and 53, as shown in Fig. 20, the other tongue or lug 86 of the latch is out of the range of the stationary lug 84, so that prong bearing halves 50 and 51 can be shifted longitudinally of each other.

In the embodiment illustrated in Figs. 22 to 25, inclusive, an arcuate latch 652 is pivoted at 87 to face 52 of longitudinally movable half 50. The arcuate latch cooperates with a relatively stationary hinge lug 57 on the half 51, to lock the halves 50 and 51 against relative longitudinal movement and the prongs against shifting.

A tongue or lug 88 on the end of the latch opposite tongue 68, may be interposed between a hinge lug 58 of the movable half 50 and a hinge lug 57 of the so-called stationary half 51, and thus prevent shifting, or relative longitudinal movement between the two halves, as shown in Figs. 22, 23 and 25. However, when the latch is moved to the position shown in Fig. 24, with the tongue 68 protruding between meeting faces 52 and 53, the halves are released for longitudinal shifting upon the hinge pin 54. When the parts are in longitudinally shifted position, the binder cannot be closed because the latch cannot be closed. In shifted position tongue 88 will strike the side of gudgeon 57, and therefore neither face 53 nor rotation of the button 67 can close the latch.

In the modifications shown in Figures 26 to 32, inclusive, the two halves 500 and 510 do not shift longitudinally of each other. Instead, the shiftable prongs 55 are borne by a plate 89 which is carried by a flange 90 of half 500 in known manner, in longitudinally movable relation thereto.

The latch 653, on its end opposite tongue 68, has a supplemental tongue 91 which actuates a supplemental latch 92 which is pivoted at 93 to the web 66 of side 500. The supplemental latch 92 is provided with a tongue or lug 94 which abuts against the end of plate 89 and prevents shifting when the latches 653 and 92 are in closed position, as shown, for example, in Figs. 26 and 27. In this embodiment the side 500, which does not shift longitudinally with relation to side 510 or to stationary prongs 56, supplies the stationary element of the shift locking mechanism.

In the modification shown in Figs. 30 to 32 a single latch 654 has opposite its tongue 68 a rear tongue 95 which, when moved into a slot 96 in flange 90 of side 500, prevents longitudinal shifting of prong bearing shift plate 89.

Other embodiments within the scope of the invention will occur to those skilled in the art.

The novel shift locking mechanism provides means to automatically lock the shifting mechanism as the book is closed so that even after the book is opened again, the shifting mechanism will stay locked until the operator purposely unlocks it by means of the button provided on the latch.

The novel mechanism further provides means for preventing closing of the binder while the prongs are in offset position.

The novel mechanism may further be used to prevent locking the shifting mechanism when it is in offset or shifted position, so that when the prongs are in offset position they can always be shifted back to normal position.

I claim:

1. In a prong binder having halves with meeting faces and bearing prongs, the prongs on one half being longitudinally shiftable relative to those on the other half; means for locking the prongs against shifting comprising a shift locking bar longitudinally slidably carried by one half and connected in longitudinally relatively stationary relation to the other half, in combination with a latch carried by the same bar carrying half, and means for automatically actuating said locking mechanism comprising the meeting face of the other half.

2. Means for locking the longitudinal shift permitting mechanism of a shift-type visible prong binder having two halves with meeting faces, comprising stop means and cooperating latch means, a pair of oppositely disposed tongues on the latch means and means for alternately moving one tongue into engagement with said stop means to lock the longitudinal shift permitting mechanism, and for moving the other tongue to protrude beyond the face of the half by which it is borne to release the longitudinal shift permitting mechanism.

3. Means for locking the longitudinal shift permitting mechanism of a shift-type visible prong binder having two halves with meeting faces, comprising stop means and cooperating latch means, a pair of angularly disposed tongues on the latch means and means for alternately moving one tongue into engagement with said stop means to lock the longitudinal shift permitting mechanism, and for moving the other tongue in the other angularly disposed direction relative to the face of the half by which it is borne to release the longitudinal shift permitting mechanism in combination with means for automatically actuating said locking mechanism comprising cooperating abutments on said latch and on the meeting face of the other half.

4. In a loose leaf binder having a pair of halves, faces on the halves which meet when the binder is closed, prongs associated with each half of said binder, the prongs associated with one half being longitudinally shiftable, in combination with means for locking said prongs against shifting comprising stop means borne on the same side of the binder as the shiftable prongs, a latch cooperating therewith and means for alternately moving the latch into engagement with said stop means to thereby prevent movement of said prongs, and for moving the latch to protrude beyond the face of the half by which it is borne, and means for actuating said latch comprising the meeting face of the other half.

5. In a loose leaf binder comprising a pair of frames each carrying a set of longitudinally spaced transversely extending prongs, said binder having means for mounting said frames for movement toward and away from each other to close and open said binder, said binder including means for mounting said sets of prongs for longitudinal shifting relative to each other, the combination of shift locking means comprising a stop for preventing said longitudinal shifting and a latch movable relative thereto into engagement with said stop, and means actuated by closing said binder and cooperating with said latch and stop for preventing said shifting when said binder is reopened.

6. In a loose leaf binder, a pair of frames each carrying a set of longitudinally spaced transversely extending prongs, means for mounting said frames for movement toward and away from each other to close and open said binder, said frames including means for mounting said sets of prongs for longitudinal shifting relative to each other, in combination with shift locking means comprising a stop for preventing said longitudinal shifting and a latch carried by one of said frames and movable relative thereto into engagement with said stop, said latch being movable relative to its frame out of latching engagement with said stop to permit said shifting whenever said stop is unlatched, means for preventing closing of said binder while the prongs are in shifted position, and means actuated by closing said binder with the prongs in nonshifted position for reversely moving said latch into engagement with said stop.

7. In a loose leaf binder, a pair of frames each carrying a set of longitudinally spaced transversely extending prongs, means for mounting said frames for movement toward and away from each other to close and open said binder, said frames including means for mounting said sets of prongs for longitudinal shifting relative to each other, in combination with shift locking means comprising a stop for preventing said longitudinal shifting and a latch carried by one of said frames and movable alternately into latched position in engagement with said stop, and manual means for moving said latch alternately into position clear of said stop and having an operating button accessible from outside of said latch carrying frame, and means actuated by closing said binder with the prongs in nonshifted position for reversely moving said latch into engagement with said stop.

8. In a loose leaf binder, a pair of frames each carrying a set of longitudinally spaced transversely extending prongs, means for mounting said frames for movement toward and away from each other to close and open said binder, said frames including means for mounting said sets of prongs for longitudinal shifting relative to each other in combination with shift locking means for preventing said longitudinal shifting comprising a stop mounted in longitudinal sliding relation with respect to one of said frames and in longitudinally stationary relation with respect to the other, and a latch engaging said stop to prevent relative longitudinal sliding thereof and thereby prevent said longitudinal shifting, said latch being carried by one of said frames and movable relative thereto out of engagement with said stop to permit said sliding in full and partly open positions of said binder, and means actuated by closing said binder with the prongs in nonshifted position for reversely moving said latch relative to its frame into engagement with said stop.

9. In a loose leaf binder, a pair of angular frame members each having rigid therewith a set of longitudinally spaced transversely extending prongs, means for pivoting said frame members directly to each other for transverse movement toward and away from each other to close and open said binder, means for mounting said frames for relative longitudinal shifting, in combination with shift locking means for preventing said longitudinal shifting in all transverse positions of said binder, said shift locking means being releasable to permit said shifting in full and partly open positions of said binder, and means for retaining said shift locking means in released position in all longitudinal positions of said sets and in fully and partly open positions of said binder.

10. In a loose leaf binder, a pair of angular frame members each rigidly carrying a set of longitudinally spaced transversely extending prongs, pivoted means for connecting said frame members directly to each other for movement toward and away from each other to close and open said binder, said connecting means being constructed and arranged for relative longitudinal movement of said frame members to shift said sets of prongs, means for locking said frame members to prevent said shifting in all transverse positions of said binder, said locking means being releasable to permit said shifting in fully and partly open positions of said binder.

11. In a loose leaf binder, a pair of frame members each carrying a set of longitudinally spaced transversely extending prongs, means for mounting said frame members for movement toward and away from each other to close and open said binder, means for mounting said sets of prongs for relative longitudinal shifting, in combination with shift locking means for preventing said longitudinal shifting in all transverse positions of said binder, said shift locking means comprising a stop longitudinally slidably mounted on one of said frame members and engaging the other frame member in all positions of said binder to maintain said stop longitudinally stationary with respect to said other frame member, and a latch engaging said stop to prevent longitudinal sliding thereof and thereby prevent said longitudinal shifting, said latch being movable out of engagement with said stop to permit said sliding in full and partly open positions of said binder, and means for retaining said latch out of engagement with said stop in all longitudinal positions of said sets in full and partly open positions of said binder.

12. In a loose leaf binder, a pair of frame members each carrying a set of longitudinally spaced transversely extending prongs, means for mounting said frame members for movement toward and away from each other to close and open said binder, means for mounting said sets of prongs for relative longitudinal shifting, said mounting means for one of said sets having an elongated slot and longitudinally slidably carrying a fin in lost motion engagement with said slot but longitudinally stationary with respect to the other set, stop means longitudinally slidable with respect to said slot and engaging said fin, and latch means for retaining said stop to eliminate said lost motion and thereby prevent said shifting.

13. In a loose leaf binder, a pair of frame members each carrying a set of longitudinally spaced transversely extending prongs, means for mounting said frame members for movement toward and away from each other, means for retaining said frames at a predetermined position in said movement, means for mounting the prongs of one frame member for longitudinal shifting relative to the other set, means cooperating with said position retaining means in all transverse positions of said binder for locking said sets to prevent said longitudinal shifting, said locking means being releasable to permit said longitudinal shifting.

14. In a loose leaf binder, a pair of frame members each carrying a set of longitudinally spaced transversely extending prongs, means for mounting said frame members for movement toward and away from each other to close and open said binder, means for mounting said sets of prongs for relative longitudinal shifting, in combination with shift locking means for preventing said longitudinal shifting in all transverse positions of said binder, said shift locking means being releasable to permit said shifting in full and partly open positions of said binder and means for retaining said shift locking means in released position in all longitudinal positions of said sets and in full and partly open positions of said binder and means actuated by closing said binder when said prongs are in non-shifted position for rendering said retaining means inoperative.

15. In a loose leaf binder, a pair of frame members each carrying a set of longitudinally spaced transversely extending prongs, means for mounting said frame members for movement toward and away from each other to close and open said binder, means for mounting said sets of prongs for relative longitudinal shifting, in combination with shift locking means for preventing said longitudinal shifting in all transverse positions of said binder, said shift locking means being releasable to permit said shifting in fully and partly open positions of said binder, means for retaining said shift locking means in released position in all longitudinal positions of said sets and in full and partly open positions of said binder and means cooperating at a point spaced from said prongs for preventing closing of said binder when said prongs are in shifted position.

16. In a loose leaf binder, a pair of frame members each carrying a set of longitudinally spaced transversely extending prongs, means for mounting said frame members for movement toward and away from each other to close and open said binder, means for mounting said sets of prongs for relative longitudinal shifting, in combination with shift locking means for preventing said longitudinal shifting in all transverse positions of said binder, said shift locking means being releasable to permit said shifting in fully and partly open positions of said binder, means for preventing closing of said binder when said prongs are in shifted position and means actuated by transversely moving the frame members together when said prongs are in non-shifted position to cooperate with said shift locking means to prevent longitudinal shifting.

17. In a loose leaf binder, a pair of frames each carrying a set of longitudinally spaced transversely extending prongs, means for mounting said frames for movement toward and away from each other to close and open said binder, said frames including means for mounting said sets of prongs for longitudinal shifting relative to each other, in combination with shift locking means comprising a stop for preventing said longitudinal shifting of the set of prongs of one of said frames and movable relative to said set, and a latch carried by the same frame and movable relative thereto alternately into latched position in engagement with said stop, and alternately into unlatched position clear of said stop.

18. In a loose leaf binder, a pair of frame members comprising meeting faces and plate portions therabove extending away from each other, said plate portions each having rigidly secured thereto a set of longitudinally spaced transversely extending prongs, means pivotally connecting said meeting faces and permitting relative longitudinal sliding thereof to shift said prongs, in combination with shift locking means comprising a stop for preventing said longitudinal shifting and a latch movable relative thereto alternately into latched position in engagement with said stop, and alternately into unlatched position clear of said stop.

19. In a loose leaf binder, a pair of frame members each carrying a set of longitudinally spaced transversely extending prongs, said frame members comprising meeting faces and plate portions therabove extending away from each other, means for mounting said frames for movement toward and away from each other to close and open said binder, said frames including means for mounting said sets of prongs for longitudinal shifting relative to each other, one of said frame members having a transverse slot in its plate portion and an aperture in its meeting face, in combination with shift locking means comprising a stop member mounted below said slotted frame member in relative longitudinally slidable relation, a latch mounted in said frame member and having a finger piece projecting through said transverse slot and movable toward said meeting face to release said stop member, said latch having spring means for holding it in released position, and cooperating means on said latch and the other frame member and operable through said aperture and actuated by closing the binder for overcoming said spring means and moving said latch in the opposite direction to shift locking engagement with said stop.

20. In a loose leaf binder, a pair of frames each carrying a set of longitudinally spaced transversely extending prongs, means for mounting said frames for movement toward and away from each other to open and close said binder, said frames including means for mounting said sets of prongs for longitudinal shifting relative to each other, a back member associated with one of said frame members in relative longitudinally slidable relation thereto and a latch movably mounted on the same frame member, said back member having means adapted to engage said latch when said prongs are in non-shifted position to prevent shifting of said prongs.

21. In a loose leaf binder, a pair of frames each having a set of longitudinally spaced transversely extending prongs, means for mounting and connecting said frames for relative pivoted movement and for longitudinal shifting relative to each other, in combination with shift locking means for preventing said longitudinal shifting, comprising a latch having a movable axis parallel to the pivotal axis of said frames and having a movement into latched position in engagement with said first named means and into unlatched position clear of said first named means.

22. In a loose leaf binder, a pair of hinged back sections shiftable longitudinally relative to each other in fully opened or intermediate position, a locking slide mounted in one of said back sections, said locking slide moving relative to said one back section when said back sections are shifted in intermediate position, and releasable means for preventing said relative movement between said locking slide and said one back section.

23. In a loose leaf binder, a pair of back sections shiftable longitudinally relative to each other, a latching bar secured to one of said sections, a locking slide secured to the other of said sections and engageable with said latching bar, and releasable means engaging said latching bar to prevent shifting of said sections when said locking slide is in engagement with said latching bar.

24. In a loose leaf binder having complementary back sections: a hinge connection between said sections, said connection enabling the sections to move longitudinally relative to each other; and a releasable latch having a part normally disposed between the adjacent hinge loops of the two sections to hold the sections against relative longitudinal motion.

25. In a loose leaf binder having complementary sections, each carrying a plurality of impaling prongs: a hinge connection between said sections comprising, interengaging hinge loops on said sections and a hinge pin passing through said loops, said hinge loops being shorter than the spaces into which they extend so as to enable relative longitudinal shifting of the sections; and a releasable latch having a part normally disposed between adjacent hinge loops on the two sections to hold the sections against relative endwise movement at one limit of their permitted movement.

26. In a loose leaf binder, a pair of back sections hinged together, said back sections being shiftable longitudinally relative to each other, a latching bar operative to hold said back sections in closed or in intermediate position, and a latch engageable with said latching bar to prevent longitudinal shifting of said back sections, said latch being non-releasable when said back sections are in closed position.

27. In a loose leaf binder, a pair of back sections hinged together, said back sections being shiftable longitudinally relative to each other, a latching bar mounted in one of said back sections and shiftable with said other back section relative to said first mentioned back section, and releasable means cooperating with said bar to prevent longitudinal shifting of said back sections.

28. In a loose leaf binder, a pair of back sections hinged together and movable longitudinally relative to each other, means in one of said back sections cooperating with means in said other back section to hold said back sections in a plurality of predetermined angular positions, and means in said first mentioned back section cooperating with said first mentioned means to hold said back sections against relative longitudinal movement.

29. In a prong binder having pivoted longitudinally shiftable halves with meeting faces one of which has a longitudinal slot and a catch movable within said slotted half, a stop unit mounted in said binder for longitudinal sliding relative to one of said halves but longitudinally stationary relative to the second of said halves, said stop unit comprising a detent passing through said slot for engagement with said catch to retain said halves against pivotal movement, and a latch carried by the first of said halves and movable into the path of said stop unit for preventing said longitudinal shifting.

30. In a prong binder having pivoted longitudinally shiftable halves with meeting faces one of which has a longitudinal slot, a stop unit mounted in said binder for longitudinal sliding relative to a first of said halves but longitudinally stationary relative to the other, said stop unit comprising a detent passing through said slot and a hinge lug receiving the common pivot of said halves, and a latch carried by the first half and movable into the path of said stop unit for preventing said longitudinal shifting.

31. In a prong binder having prong bearing halves and interfitting hinge lugs associated therewith, the lugs for one half being shorter than the spaces between adjacent lugs for the other to permit longitudinal shifting of said halves, a stop unit longitudinally slidably mounted relative to one half and including a hinge lug aligned with said interfitting lugs and cooperating with certain lugs associated with the other half to prevent longitudinal movement of said unit relative to said other half, and a latch carried by the half which is slidable relative to the stop and movable into the path of said stop unit for preventing said longitudinal shifting.

32. In a loose leaf binder, a pair of back sections shiftable longitudinally relative to each other, a latching bar secured to one of said sections, a locking slide secured to the other of said sections and engageable with said latching bar, means engaging said latching bar to prevent longitudinal shifting of said sections when said locking slide is in engagement with said latching bar, and a spring tending to hold said means in operative position, said means being movable to inoperative position against the action of said spring.

33. In a loose leaf binder, a pair of back sections shiftable longitudinally relative to each other, a latching bar secured to one of said sections, a locking slide secured to the other of said sections and engageable with said latching bar, means engaging said latching bar to prevent shifting of said sections when said locking slide is in engagement with said latching bar, said means being movable to inoperative position, and means for automatically returning said first-mentioned means to operative position.

34. In a loose leaf binder, a pair of box members each comprising a top and a side, a set of longitudinally spaced transversely extending prongs secured in rigid relation to each box, means pivotally connecting said sides and permitting relative longitudinal sliding thereof to shift said prongs, in combination with shift locking means comprising means for preventing said longitudinal shifting in any transverse position of said binder, and a latch movable alternately into latched position in engagement with said last mentioned means, and alternately into unlatched position clear of said means.

35. In a loose leaf binder, a pair of frames each having a set of longitudinally spaced transversely extending prongs rigid therewith, said frames having side flanges pivoted together and permitting relative longitudinal shifting thereof, in combination with shift locking means comprising stop means for preventing said longitudinal shifting and latch means mounted for movement alternately into latched position in engagement with said stop and alternately into unlatched position clear of said stop, manual means for moving said latch, and spring means for holding said latch in latched position.

LOUIS SUPIN.